April 9, 1957 R. A. GILMOUR 2,788,244

SLIDE CONTROL VALVES FOR SPRAYERS

Filed May 15, 1953

INVENTOR.
ROBERT A. GILMOUR
BY Jack R. Snyder
ATTORNEY 2,788,244

SLIDE CONTROL VALVES FOR SPRAYERS

Robert A. Gilmour, Somerset, Pa.

Application May 15, 1953, Serial No. 355,223

1 Claim. (Cl. 299—84)

This invention relates to a slide control valve for a sprayer of the type designed and intended for spraying flowers, trees, shrubbery, or like plants and vegetation with an insecticide or analogous solutions.

Important objects and advantages of the invention are to provide a control valve of the character described, which embodies a slide valve member that is conveniently adjustable to accurately vary and control the quantity of the treated solution that is being added to the spraying mixture during the spraying operations, and which includes visible means for apprising the operator as to the extent of the valve adjustment providing the proper spraying mixture and thereby facilitate and expedite spraying operations.

Further objects of the invention are to provide a device of the class stated, which may be readily used by any one of ordinary skill, which is simple in its construction and arrangement, durable and efficient in its use, compact, and comparatively economical in its manufacture and use.

To the accomplishment of these and such other objects as may hereinafter appear, the invention resides in the novel construction, combination and arrangement of parts herein specificially described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views.

Figure 1:
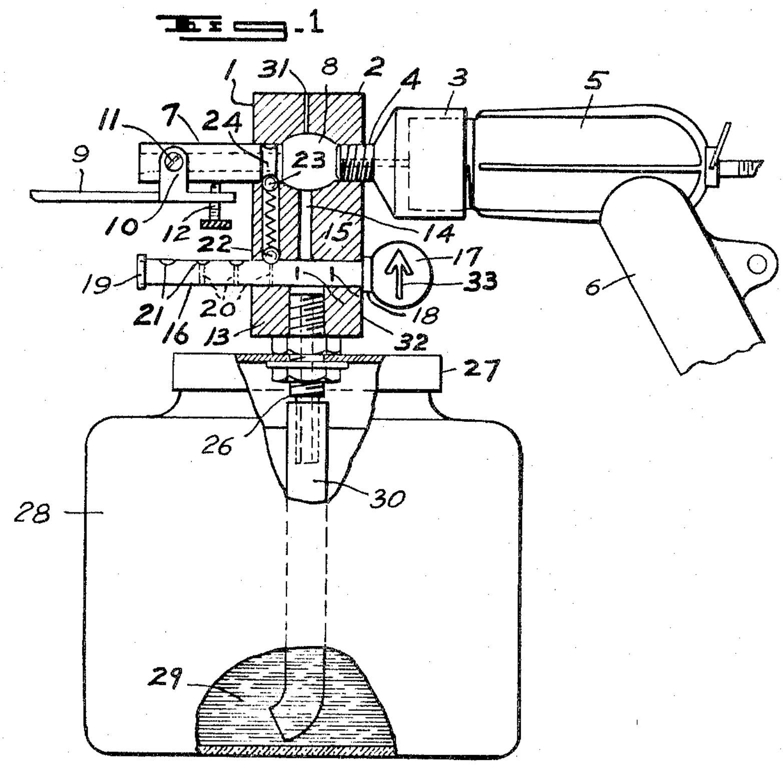
Figure 1 is a side elevational view, partly in cross section, of a sprayer embodying a control valve constructed in accordance with the invention.

Referring in detail to the drawing, the improved control valve comprises a cylindrical, vertically extending valve body 1. The body is provided with a centrally disposed, transversely extending passage 2, which is positioned adjacent to but spaced from the top of the valve body.

A nozzle cap 3, including a reduced apertured plug 4 having screw thread connection with the inner end of the transverse passage 2, is carried by the valve body 1 and is adapted for screw thread attachment with the discharge end of the barrel 5, of a water gun 6. The water gun is of the conventional hand-controlled type of construction and is adapted for connection with the water supply hose.

A horizontally extending discharge tube 7 is revolubly supported, in any suitable manner, in the outer end of the transversely extending passage 2 and is aligned with but spaced from the cap plug 4 which is engaged in the other end of said passage 2. The space between the adjacent ends of the discharge tube and the cap plug is enlarged to form the fluid mixing chamber 8 for the spraying mixture.

A fluid spreader 9 is shiftably supported by the discharge tube 7 adjacent to the outer free end of the latter. The fluid spreader is provided with a pair of spaced attaching lugs 10, which engage respective sides of the discharge tube and which are pivotally connected to the latter by respective pivoting screws 11.

The spreader 9 projects a considerable distance beyond the outer free end of the discharge tube 7, and the surface thereof disposed toward the discharge tube, is flat and of considerable width. The rearwardly projecting part of the spreader is provided with an adjusting screw 12, which may be adjusted to engage the discharge tube to shift the spreader to various angles from the horizontal to positions to best meet conditions found in practice.

The spraying solution discharging from the discharge tube will forcibly strike against the flat top surface of the spreader 9 and thereby cause a fanlike dispersion of the spraying solution.

The valve body 1 is provided with a vertically extending, diametrically disposed valve passage 13, which opens at the lower end of the valve body, and which includes a reduced upper portion 14 opening into the mixing chamber 8. The valve body is further provided with a transversely extending valve passage 15, which is disposed in spaced relation below and parallel to the other transverse passage 2, and which extends through the lower end of the reduced portion 14 of the vertical passage 13.

A cylindrical, horizontally disposed, elongated valve slide 16 is mounted in the transverse valve passage 15, and is frictionally slidable in the latter for adjustment in the longitudinal direction. The valve slide is formed with an operating disk 17 and an annular shoulder 18 at the inner end thereof, and with a fixed collar 19 at its outer free end to prevent the inadvertent removal of the valve slide from the valve passage 15.

The valve slide 16 is provided with three vertically extending inlet ports 20, which are longitudinally aligned in equally spaced relation to each other. The inlet ports are disposed on the outwardly disposed portion of the valve slide and vary in diameters to provide consequent varying capacities, with the smallest of the inlet ports being preferably positioned toward the operating disk 17.

Figure 2:
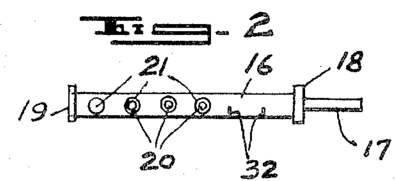
Figure 2 is a top plan view of the slide control valve.
Figure 3:
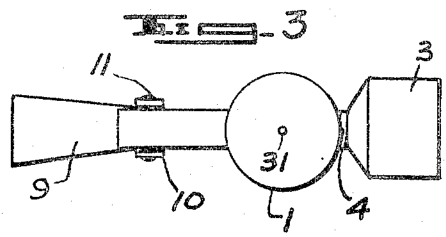
Figure 3 is a top plan view of the sprayer.

The valve slide 16 is further provided with four longitudinally aligned shallow pockets 21, three of which pockets are formed at the upper ends of respective inlet ports, and the other of said pockets being disposed between the outer of said inlet ports and the collar 19, as clearly illustrated in Figure 2.

To adjust the valve slide 16 in the valve passage 15, the former is shifted longitudinally in the latter to bring the selected inlet port 20 into the vertical valve passage 13 to establish communication through the latter. The valve slide is arrested in the adjusted position by means of a spring actuated ball 22, which is suitably located in the valve body 1 and operable for automatic clicking and engaging action in the pocket 21 then in registration with the ball.

It will be here noted that another ball 23, operated by the same spring actuation is employed to engage in an annular groove 24 in the discharge tube 7, to revolubly connect the latter with the valve body.

When the valve slide 16 is in its foremost position in the valve passage 15, permitted by the shoulder 18, the valve slide is in the closed position, as clearly shown in Figure 1. The side of the valve slide displays line marks 32, which are respectively exposed when the valve slide is shifted to the opening positions to apprise the operator which one of the inlet ports is then disposed in the valve passage 15. An arrow mark 33 is displayed on the operating disk 17 to indicate the directional positions of the inlet ports and of the pockets 21.

It will be apparent that, while but three inlet ports 20 are illustrated and described in the disclosure of the invention, any suitable number of such inlet ports may be embodied in the device without departing from the principle of the invention.

A connecting sleeve 26 is threadedly engaged in the lower end of the valve passage 13 and projects a considerable distance beyond the lower end of the valve body 1. The projecting end of the connecting sleeve extends through the lid 27 of the receptacle 28, which contains the treated fluid 29, and is secured to the lid in any suitable manner. A hose 30 is attached to the lower end of the connecting sleeve and depends into the receptacle to the bottom of the latter, as shown in Figure 1.

In the operation of the sprayer embodying the improved slide control valve, the valve slide 16 is first adjusted in the valve passage 15 to selectively position the proper inlet port 20 into registration with the vertical valve passage 13, such positioned inlet port having the capacity to provide the predetermined quantity of treated fluid 29 to the spraying mixture.

The forced flow of water through the nozzle cap 3, and through the transverse passage 2 and discharge tube 7, will create a vacuum drawing a predetermined quantity of the treated fluid 29 from the receptacle 28, through the hose 30 and through the connecting sleeve 26 and through the positioned inlet port 20, to mix with and impregnate the water flowing through the mixing chamber 8, and thereby produce the desired spraying solution. An air vent 31 in the top of the valve body and opening into the mixing chamber 8 will aid in vaporizing the spraying solution for more efficient spraying operations.

It will be noted that the device can be employed for spraying purposes by using air instead of water to create the necessary vacuum to provide the drawing action required. When so using air, the hose 30 would be extended into a quantity of premixed solution containing all of the ingredients necessary for the purpose intended. Such premixed solution may be paint, a detergent, or any other chemical composition in fluid form.

The present invention provides a most efficient device of its kind, which may be economically constructed, and successfully employed for the purposes and in the manner herein set forth.

What I claim is:

A sprayer control valve of the class described comprising, in combination, a valve body provided with a transversely disposed valve passage and with a vertically disposed valve passage extending through said transversely disposed valve passage, an elongated valve slide mounted in said transversely disposed valve passage, said valve slide provided with a plurality of vertically extending spaced inlet ports of varying diameters and being longitudinally adjustable in said transversely disposed valve passage to selectively position any one of said inlet ports into registration with said vertically disposed valve passage, said valve slide formed with a pocket at the upper end of each of said inlet ports, an operating member carried at one end of said valve slide and being provided with a mark indicating the directional positions of said ports and of said pockets, a collar carried at the other end of said valve slide to prevent the removal of the latter from said transversely disposed valve passage, said valve body provided with a mixing chamber at the upper end of said vertically disposed valve passage and having an air vent, a discharge tube revolubly engaged in said valve body, the inner end of said tube opening into said chamber and being formed with an annular groove, automatically operable means carried by said valve body and engaging said valve slide pockets for holding the latter in the adjusted position in said transversely disposed valve passage, and further engaging in said groove to revolubly connect said tube in said valve body said valve slide formed with markings to indicate the positions of said inlet ports with respect to said vertically disposed valve passage, and a nozzle cap connected with said valve body and having the inner end thereof opening into said chamber.

References Cited in the file of this patent

UNITED STATES PATENTS

| | | |
|---|---|---|
| 1,278,713 | Moore | Sept. 10, 1918 |
| 1,679,219 | Huff | July 31, 1928 |
| 1,770,912 | Clapp | July 22, 1930 |
| 1,813,100 | Swindle | July 7, 1931 |
| 1,921,298 | Lewis | Aug. 8, 1933 |